United States Patent
Bonta et al.

(10) Patent No.: US 7,894,371 B2
(45) Date of Patent: Feb. 22, 2011

(54) SYSTEM AND METHOD OF RESOURCE ALLOCATION WITHIN A COMMUNICATION SYSTEM

(75) Inventors: Jeffrey D. Bonta, Arlington Heights, IL (US); George Calcev, Hoffman Estates, IL (US); Benedito J. Fonseca, Jr., Glen Ellyn, IL (US); Nitin R. Mangalvedhe, Streamwood, IL (US); James P. Michels, Lake Zurich, IL (US); Nathan J. Smith, Crystal Lake, IL (US)

(73) Assignee: Motorola, Inc., Schaumburg, IL (US)

( * ) Notice: Subject to any disclaimer, the term of this patent is extended or adjusted under 35 U.S.C. 154(b) by 439 days.

(21) Appl. No.: 11/831,413

(22) Filed: Jul. 31, 2007

(65) Prior Publication Data

US 2009/0034432 A1    Feb. 5, 2009

(51) Int. Cl.
*H04L 12/28*    (2006.01)
*H04W 72/00*    (2009.01)

(52) U.S. Cl. ........................................ 370/254; 455/451
(58) Field of Classification Search ........................ None
See application file for complete search history.

(56) References Cited

U.S. PATENT DOCUMENTS

| | | | |
|---|---|---|---|
| 7,437,158 B2 * | 10/2008 | Russell | 455/435.2 |
| 7,697,456 B2 | 4/2010 | Ekl et al. | |
| 2002/0071449 A1 | 6/2002 | Ho et al. | |
| 2003/0054818 A1 * | 3/2003 | Bahl et al. | 455/432 |
| 2004/0063458 A1 * | 4/2004 | Hori et al. | 455/554.2 |
| 2004/0156351 A1 * | 8/2004 | Kim | 370/349 |
| 2004/0203787 A1 * | 10/2004 | Naghian | 455/437 |
| 2004/0230374 A1 * | 11/2004 | Tzamaloukas | 701/217 |
| 2005/0053015 A1 * | 3/2005 | Jin et al. | 370/254 |
| 2005/0157747 A1 * | 7/2005 | Yang et al. | 370/465 |
| 2005/0282494 A1 | 12/2005 | Kossi et al. | |

(Continued)

FOREIGN PATENT DOCUMENTS

EP    0924896 A1    6/1999

OTHER PUBLICATIONS

PCT International Search Report Application No. PCT/US20008/071422 dated Dec. 18, 2008-19 pages.
IEEE Standard Part 11: Wireless Lan Medium Access Control (MAC) and Physical Layer (PHY) Specification dated Jun. 26, 1997-44 pages.
Mario Geria et al—"Multicluster, Mobile, Multimedia Radio Networks" -Wireless Networks 1, (1995)-pp. 255-265.

(Continued)

*Primary Examiner*—Hong Cho
*Assistant Examiner*—Eunsook Choi
(74) *Attorney, Agent, or Firm*—Rando L. Karpinia

(57) ABSTRACT

A system and method of resource allocation within a communication system is provided. A communication system comprises a plurality of nodes operating in a first architecture network mode, wherein at least a portion of the plurality of nodes are reconfigured to operate in a second architecture network mode in response to a change in one or more network performance requirements. When the plurality of nodes are operating in a distributed architecture network mode, at least a portion of the plurality of nodes are reconfigured to operate in a clustered architecture network mode in response to an increase in one or more network performance requirements. When the plurality of nodes are operating in a clustered architecture network mode, at least a portion of the plurality of nodes are reconfigured to operate in a distributed architecture network mode in response to a decrease in one or more network performance requirements.

34 Claims, 7 Drawing Sheets

U.S. PATENT DOCUMENTS

| | | | |
|---|---|---|---|
| 2006/0215576 A1* | 9/2006 | Yu et al. | 370/252 |
| 2007/0036089 A1 | 2/2007 | Metke et al. | |
| 2007/0047570 A1* | 3/2007 | Benveniste | 370/448 |
| 2007/0086424 A1 | 4/2007 | Calcev et al. | |
| 2007/0201381 A1 | 8/2007 | Ekl et al. | |
| 2007/0204021 A1 | 8/2007 | Ekl et al. | |
| 2008/0189394 A1* | 8/2008 | Ross et al. | 709/219 |
| 2009/0201860 A1* | 8/2009 | Sherman et al. | 370/329 |

OTHER PUBLICATIONS

Chunhung R. Lin et al-Adaptive Clustering for Mobile Wireless Networks -IEEE JSAC, vol. 15, No. 7, Sep. 1977-pp. 1265-1275.

PCT/US2008/071422, Preliminary Report on Patentability, mailed Feb. 11, 2010, 14 pages.

* cited by examiner

SYSTEM AND METHOD OF RESOURCE ALLOCATION WITHIN A COMMUNICATION SYSTEM

FIELD OF THE INVENTION

The present invention relates generally to wireless communications and more particularly to resource and interference management in an ad hoc network.

BACKGROUND

Types of wireless networks include infrastructure-based wireless networks and ad hoc wireless networks.

Ad hoc networks are self-forming networks which can operate in the absence of any fixed infrastructure, and in some cases the ad hoc network is formed entirely of mobile nodes. An ad hoc network typically includes a number of geographically-distributed, potentially mobile units, sometimes referred to as "nodes," which are wirelessly connected to each other by one or more links (e.g., radio frequency communication channels). The nodes can communicate with each other over a wireless media without the support of an infrastructure-based or wired network. Links or connections between these nodes can change dynamically in an arbitrary manner as existing nodes move within the ad hoc network, as new nodes join or enter the ad hoc network, or as existing nodes leave or exit the ad hoc network. Because the topology of an ad hoc network can change significantly techniques are needed which can allow the ad hoc network to dynamically adjust to these changes. Due to the lack of a central controller, many network-controlling functions can be distributed among the nodes such that the nodes can self-organize and reconfigure in response to topology changes.

One characteristic of ad hoc network nodes is that each node can directly communicate over a short range with nodes which are a single "hop" away. Such nodes are sometimes referred to as "neighbor nodes." When a node transmits packets to a destination node and the nodes are separated by more than one hop (e.g., the distance between two nodes exceeds the radio transmission range of the nodes, or a physical barrier is present between the nodes), the packets can be relayed via intermediate nodes ("multi-hopping") until the packets reach the destination node. In such situations, each intermediate node routes the packets (e.g., data and control information) to the next node along the route, until the packets reach their final destination. For relaying packets to the next node, each node maintains routing information collected through conversation with its neighboring nodes. The routing information can also be periodically broadcast in the network to reflect the current network topology. Alternatively, to reduce the amount of information transmitted for maintaining accurate routing information, the network nodes may exchange routing information only when it is needed.

Resource allocation is an important design aspect of ad hoc networks. IEEE 802.11 and Bluetooth are two predominant ad hoc networking standards. IEEE 802.11 is a Carrier Sense Multiple Access (CSMA) based system where resources are competed for in a distributed architecture. Bluetooth is a Time Division Multiple Access (TDMA) based system where resources are allocated by a centralized master controller.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
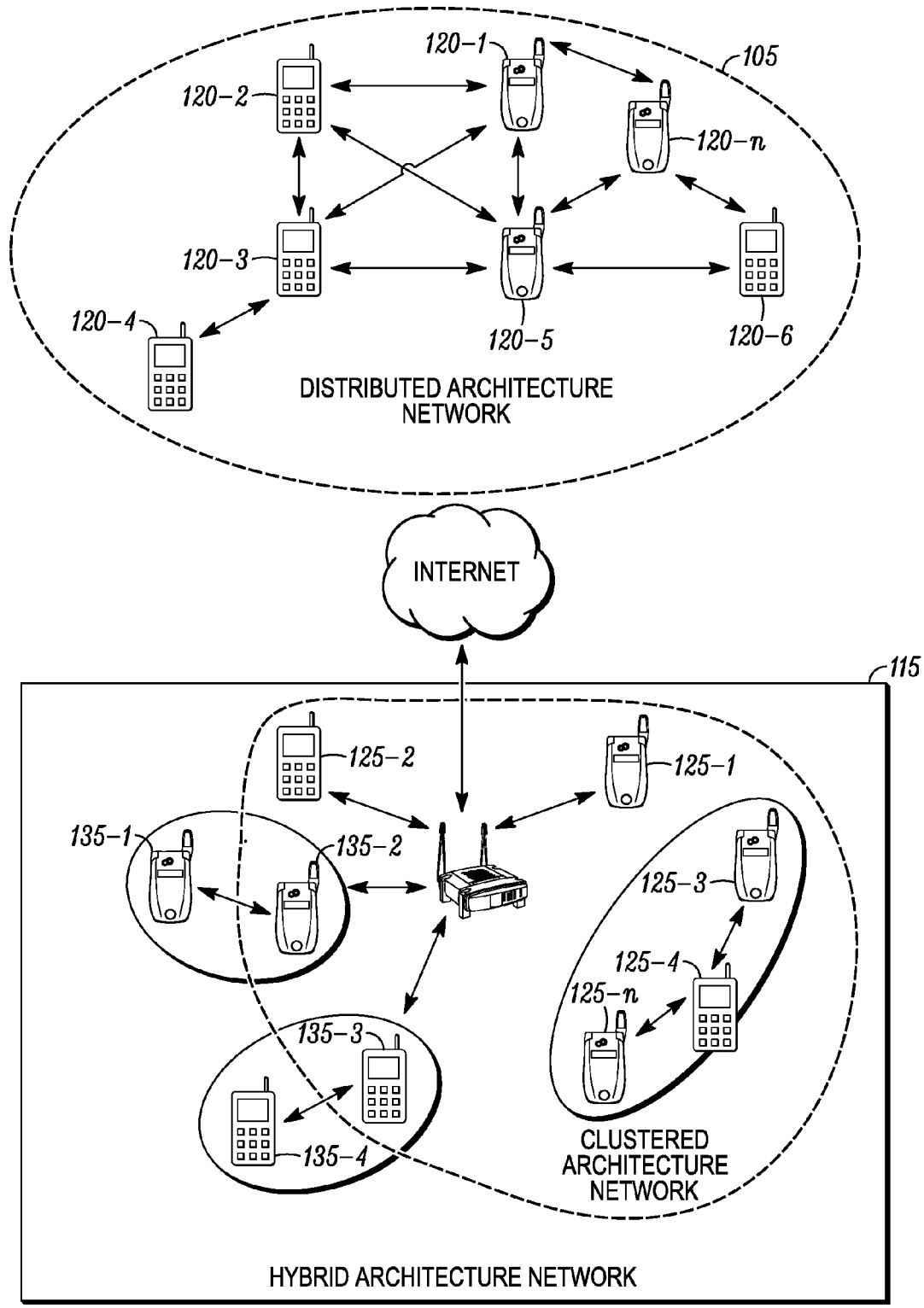
FIG. 1 is an example block diagram of a communication network.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to resource allocation within a communication system. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions of resource allocation within a communication system described herein. The non-processor circuits may include, but are not limited to, a radio receiver, a radio transmitter, signal drivers, clock circuits, power source circuits, and user input devices. As such, these functions may be interpreted as steps of a method to perform resource allocation within a communication system. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and integrated circuits (ICs) with minimal experimentation.

Any embodiment described herein is not necessarily to be construed as preferred or advantageous over other embodiments. All of the embodiments described in this Detailed Description are illustrative provided to enable persons skilled in the art to make or use the invention and not to limit the scope of the invention which is defined by the claims.

Today's ad hoc networks typically function either as a distributed architecture or a clustered architecture. Distributed architectures offer maximum adaptability for ad hoc networks with low traffic, low user density, and/or low contention and offers maximum simplicity for network formation. Small ad hoc networks (e.g. less than five nodes) should be nimble, able to form quickly with little overhead to exchange bursts of content. Distributed control architecture networks are easily configurable for low traffic environments, are optimal, for example, for peer to peer (P2P) applications that want to exchange a burst of traffic, and are well suited, for example, to enable multi-hop networks and networks with a multi-hop backhaul.

However, as the network grows in the number of nodes or as the traffic demands increase, there is a need for a communication network to adapt to the environment and scale to meet capacity demands with a transformation that more efficiently allocates resources and manages interference. Here a clustered architecture is a better choice. Clustered control architecture networks include a medium access control (MAC) which enables scalability for high density environments, and is well-suited, for example, for Metro-Broadband applications demanding maximum capacity.

It would therefore be beneficial to incorporate a hybrid of a distributed and clustered architecture in which the multiple access method changes to meet network demands. Network demands, for example, can include the number of nodes, traffic demands, a network capacity, topology/node distribution, spatial reuse requirement to mitigate self interference, and/or external interference mitigation requirements.

FIG. 1 illustrates an example block diagram of a communication network 100 for implementation of some embodiments of the present invention. The communication network 100, for example, can comprise an ad hoc wireless communication network 100 such as a mesh enabled architecture (MEA) network or an 802.11 network (i.e. 802.11a, 802.11b, 802.11g, or 802.11s). It will be appreciated by those of ordinary skill in the art that the communication network 100 in accordance with the present invention can alternatively comprise any packetized communication network where packets are forwarded across multiple wireless hops. For example, the communication network 100 can be a network utilizing multiple access schemes such as OFDMA (orthogonal frequency division multiple access), TDMA (time division multiple access), FDMA (Frequency Division Multiple Access), or CSMA (Carrier Sense Multiple Access). Additionally, each wireless hop of the communication network 100 may either employ the same multiple access scheme as the other hops, or a unique multiple access scheme per hop.

As illustrated, the communication network 100 comprises a distributed architecture network 105 and a clustered architecture network 110. The communication network 100 further comprises a hybrid architecture network 115 which operation will be described further herein. The configuration illustrated is a fixed point in time as the configuration of each of the distributed architecture network 105, the clustered architecture network 110, and the hybrid architecture network 115 dynamically change as network requirements change as will be described herein. Specifically, although illustrated as three separate networks within the communication network 100, it will be appreciated by those of ordinary skill in the art that the various nodes operating within the communication network 100 form any combination of the distributed architecture network 105, the clustered architecture network 110, and the hybrid architecture network 115 as necessary in accordance with the present invention. It will further be appreciated by those of ordinary skill in the art, therefore, that the communication network 100 can operate in distributed, clustered, or hybrid architectures simultaneously. Furthermore, the distributed and clustered architectural configurations are capable of operating either in an autonomous ad hoc networking mode or a hybrid mesh networking mode.

As is well known in the art, an ad hoc network is a collection of nodes that self organize to form a cooperative network for wireless communications. Thus, each node has equal capabilities to act as a source, relay or destination of data packets in a communication session. Network topology dynamics are anticipated with self-healing capabilities to stabilize network connections. Extending this definition, an Autonomous Ad Hoc Network is an ad hoc network that is capable of operating in the absence of fixed infrastructure such as an access point or gateway. Each node is capable of acting as an intermediate router to facilitate multiple communications paths and extend the transmission range of a communication session through multiple hops.

As is further known in the art, a Mesh Network is an ad hoc network configuration that provides wireless connectivity for fixed infrastructure nodes with gateway interfaces to wide area networks and features multiple communications paths between nodes that may include more than one hop. The fixed infrastructure may provide wired or wireless backhaul between fixed nodes. Extending the Mesh Network definition, a Hybrid Mesh Network is a mesh network configuration consisting of stationary and mobile nodes, fixed infrastructure nodes, and gateway interfaces. The fixed infrastructure may provide wired or wireless backhaul between ad hoc nodes or autonomous ad hoc networks of stationary and mobile nodes. Thus, the ad hoc networking transmission range can be extended through single or multiple hops with fixed infrastructure and/or ad hoc capable node connections. Heterogeneous communication systems may be supported.

The operation of the communication system 100 enables distributed resource allocation when the traffic demands are low and morphs to enable a nominated cluster head to allocate resources to nodes that form a cluster when traffic demands increase is provided herein. Nodes that operate in a distributed, clustered, or hybrid architecture network each have a radio resource management system (i.e. such as a radio resource manager) to negotiate the use of radio resources such as time slots, channels, sub-channels, power levels, data rates, and the like. The radio resource management system along with cognitive environment sensing capabilities within the communication system 100 enables adaptability between all networking mode/architecture configuration combinations. The combination of modes and architectures, with the support of seamless transition between them as functions of network topology, traffic type and capacity demand, the number of nodes, topology/node distribution, spatial reuse requirements to mitigate self interference, and/or external interference mitigation requirements will provide network performance that is optimized to the use case situation.

As illustrated in FIG. 1, the distributed architecture network 105 includes a plurality of distributed mode nodes 120-1 through 120-n (referred to also as mesh points 120 or mobile nodes 120 or communication devices 120), and can, but is not required to, include a fixed network (not shown) having a plurality of intelligent access points (not shown) for providing distributed mode nodes 120 with access to the fixed network. The fixed network can include, for example, a core local area network (LAN), and a plurality of servers and gateway routers to provide network nodes with access to other networks, such as other ad-hoc networks, a public switched telephone network (PSTN) and the Internet. As can be appreciated by one skilled in the art, the distributed mode nodes 120 are capable of communicating with each other directly or indirectly. When communicating indirectly, one or more other distributed mode nodes 120, can operate as a router or routers for forwarding or relaying packets being sent between nodes.

In one embodiment, the distributed architecture 105 uses full-band TDMA as the access method. The distributed architecture is optimized for low traffic environments that make it ideal for peer-to-peer communications where nodes want to exchange a burst of traffic or for multiple hop networks and multi-hop backhaul. Resources are negotiated locally between nodes in the distributed architecture.

As illustrated in FIG. 1, the clustered architecture network 110 includes a plurality of cluster mode nodes 125-1 through 125-n (referred to also as mesh points 125 or mobile nodes 125 or communication devices 125), and can, but is not required to, include a fixed network (not shown) having a plurality of intelligent access points (not shown) for providing cluster mode nodes 125 with access to the fixed network. The fixed network can include, for example, a core local area network (LAN), and a plurality of servers and gateway routers to provide network nodes with access to other networks, such as other ad-hoc networks, a public switched telephone network (PSTN) and the Internet. As can be appreciated by one skilled in the art, the cluster mode nodes 125 are capable of communicating with each other directly or indirectly. When communicating indirectly, one or more other cluster mode nodes 125, can operate as a router or routers for forwarding or relaying packets being sent between nodes. The clustered architecture network 110 further includes a cluster head 130 for managing the communication and resources within the clustered architecture network 110. When a system of nodes is organized into clusters, there is a requirement to provide support from the MAC layer and physical layer (PHY) to enable efficient resource allocation that maximizes the performance of the network. For a system architecture where all nodes are divided into clusters, each cluster includes a cluster head 130 which functions to manage the nodes within the cluster. A cluster head 130 may have one or more of the following functions:

1) Clock synchronization to enable communication between nodes (may provide synchronization for more than one cluster),
2) Resource Allocation (e.g. resources include timeslots, hop sequence, frequency, code, bandwidth, rate, power, etc.),
3) Information repository for all nodes in the cluster including service management for parameters such as MAC/IP (Internet Protocol) addresses of nodes within the cluster, MAC/IP addresses of cluster heads from adjacent clusters, Content directory for cluster nodes with support to manage content requests, Wake/Sleep schedules for battery conservation and support to manage the schedules, Battery levels (including AC power indicator), Node types, Cluster size, and Presence detection (or lack of presence),
4) Traffic Manager to insure Admission control, Fairness, and QoS,
5) Relay/store-and-forward of content destined to cluster nodes,
6) Gateway to wide area networks (e.g. cellular, IEEE 802.11, IEEE 802.16),
7) Backbone node for route discovery, and
8) Location determination support.

In one embodiment, the clustered architecture 110 uses OFDMA-TDMA as the access method. The clustered architecture can serve high traffic environments. Here, resources are allocated by the cluster head 130 to maximize the efficient use of resources in order to maximize capacity.

As illustrated in FIG. 1, the hybrid architecture network 115 includes a plurality of nodes 135-1 through 135-n (referred to also as mesh points 135 or mobile nodes 135 or communication devices 135), and can, but is not required to, include a fixed network (not shown) having a plurality of intelligent access points (not shown) for providing nodes 135 with access to the fixed network. The fixed network can include, for example, a core local area network (LAN), and a plurality of servers and gateway routers to provide network nodes with access to other networks, such as other ad-hoc networks, a public switched telephone network (PSTN) and the Internet. As can be appreciated by one skilled in the art, the nodes 135 are capable of communicating with each other directly or indirectly. When communicating indirectly, one or more other nodes 135, can operate as a router or routers for forwarding or relaying packets being sent between nodes. The nodes 135-n operate both in a clustered mode and a distributed mode as necessary as will be described in further detail below. For example, the nodes 135-1 and 135-4 are out of single hop coverage of the cluster head 130 and are therefore illustrated as operating in a distributed mode only, whereas nodes 135-2 and 135-3 are within the single hop coverage of the cluster head 130 and provide a relay for nodes 135-1 and 135-4. Here, nodes 135-2 and 135-3 as illustrated are operating in both a distributed mode and a clustered mode where they provide a bridging communication function between a distributed architecture network and a clustered architecture network.

The hybrid architecture enables nodes to either associate with a cluster head for resource allocations or to remain in a distributed mode to negotiate for their own resources. This also enables support for nodes that desire connectivity that are outside of the domain of a cluster (i.e., nodes that are outside the range of the cluster head's control channel require multi-hop connectivity).

Nodes associated with a cluster may be within one or multiple hops from the cluster head 130. In one embodiment, the nodes associated with a cluster are within a single hop of the cluster head. Multi-hop networking is supported for cluster fringe nodes as well as for extending connectivity for nodes outside the domain or coverage of a cluster. Extended coverage support is a key capability enabled with multi-hop networking and the hybrid architecture.

One challenge to the architecture of the communication network 100 is how to adapt and transition from one network type to another while still maintaining an optimal method of resources allocation for channel access. Full-band (multi-channel) TDMA allocations do not enable optimal resource allocation for all traffic types (e.g. voice over internet protocol (VoIP) has small bandwidth demands, so a full band allocation is wasteful), but its simplicity makes it well suited for environments with low traffic demands. Orthogonal Frequency Division Multiple Access (OFDMA)-TDMA is more complex, but it does enable optimal resource allocation for all traffic types and is therefore well suited for operation where capacity requirements are higher.

Figure 2:
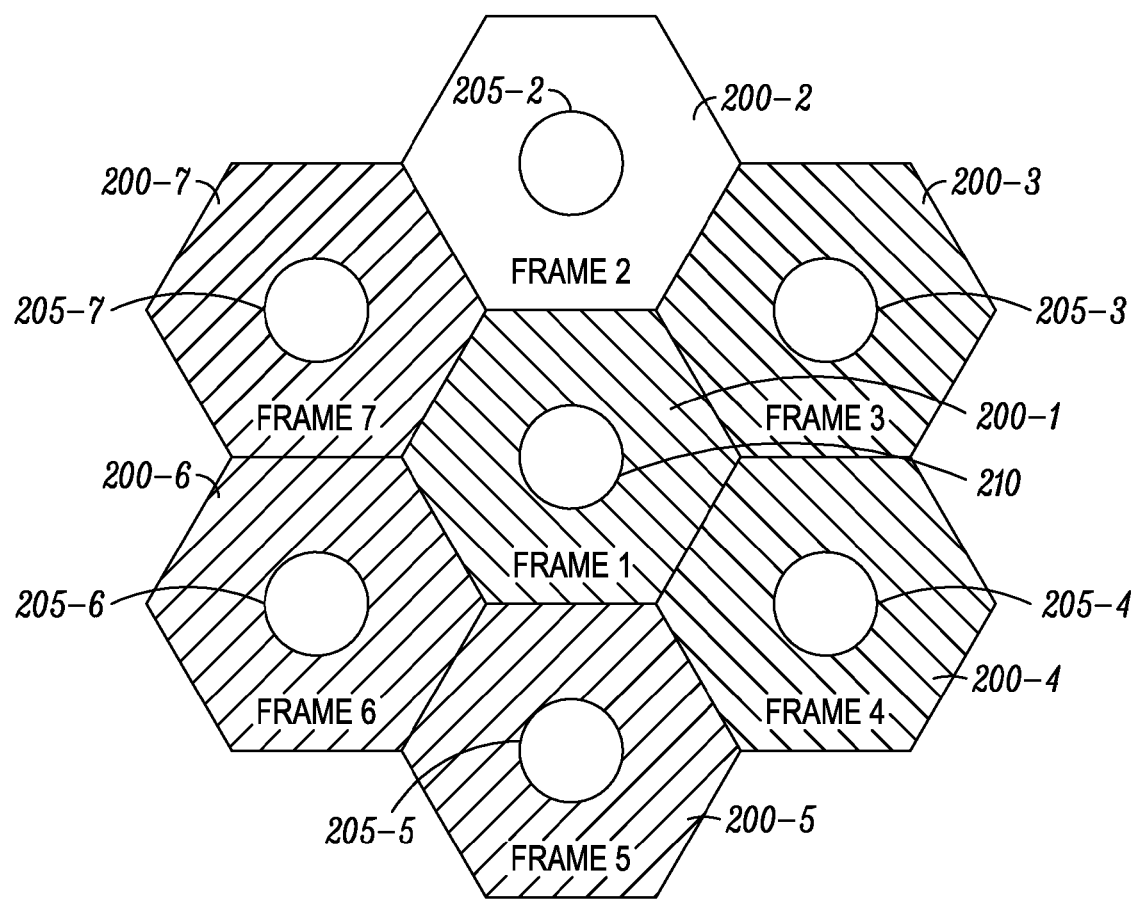
FIG. 2 is an example of multiple clusters within a communication network.

It will be appreciated that multiple clusters can be formed within the communication network 100. FIG. 2, for example, illustrates multiple adjacent clusters 200-n. In one embodiment, when multiple adjacent clusters 200-n form within the communication network 100, resources are shared so as to provide orthogonal time allocations (i.e. each cluster has a different time allocation such that only one cluster is using the full-band of frequencies at a time). Within each cluster 200-n, associated nodes request resources from the cluster head 205-n. For example, within cluster 200-2, associated nodes request resources from cluster head 205-2. Resources are allocated both in frequency and time. One of the cluster heads, 205-n can be a gateway 210 such as an intelligent access point for access to the fixed network.

In order to maximize the scalability of the system, time is orthogonally allocated between adjacent clusters based on traffic requirements of each cluster. In other words, only one cluster among a group of adjacent clusters uses the full band of frequencies at a time. Multiple adjacent clusters are possible with orthogonal time allocations before the resources are reused. For example, as illustrated in FIG. 2, there can be up to seven adjacent clusters with orthogonal time allocations. Assuming that all clusters have similar traffic load demands, each of the seven (7) adjacent clusters would receive $1/7^{th}$ of available time for communications in one embodiment. Each of the seven periods of time represent a frame and seven frames are allocated to each superframe. During any single frame, the entire spectrum allocation is available to the cluster whose frame is the current frame. The length of each frame is sized such that resources allocated to a node within a cluster will enable packets to be delivered at a frame rate of 50-frames-per-second with each frame lasting 20 milliseconds (msec). Hence a superframe is sized as per the following equation:

2.7 millisecond (msec) frame×7 frames=20 msec superframe

If a network of nodes were divided into a smaller number of clusters (e.g. from one to six nodes), the number and size of frames allocated to each cluster are negotiated between adjacent clusters based on traffic demands and network characteristics. For example, if there were five adjacent clusters, one cluster may have three frames allocated while the other four adjacent clusters have only one frame allocated to each. Hence, a single cluster could have all seven frames allocated if there were no adjacent clusters. Alternatively, the size of the frame for each cluster can be negotiated such that the number of timeslots per frame can vary. A primary motivation for forming clusters with orthogonal time frame allocations is to improve spatial reuse. A planned deployment of cluster heads could then follow a typical seven cell reuse pattern where two clusters operating with the same time allocation would be geographically separated to minimize self-interference caused by the simultaneous use of frequencies by nodes associated with the two clusters.

During the remainder of the time not allocated to each cluster, nodes associated with the cluster typically sleep to conserve battery life. It will be appreciated that these quiescent periods are also available for nodes to exercise other tasks, such as cognitive environment sensing. This built-in provision of time in the frame structure can be used for spectrum sensing by a cognitive engine to identify and adapt to available spectrum. This enables efficient co-existence in unlicensed bands and licensed bands where opportunistic use of spectrum is employed. The cognitive engine may also monitor other network characteristics such as topology/node distribution changes, spatial reuse adjustments required to mitigate self interference, and changes in external interference. Changes in network characteristics may trigger the need to adapt the frame structure or resource assignments per cluster.

Referring back to FIG. 1, given the hybrid architecture of the communication network 100, the present invention provides a system and method to enable a smooth transition between architecture types with the greatest flexibility and performance. Specifically, a unique logical channel structure coupled with a unique procedure for morphing a distributed architecture into a clustered or hybrid architecture is provided herein. The logical channel structure comprises a unique combination and use of a Synchronization Channel with sub-channels used for conveying synchronization, paging, and system information, an Access Channel with sub-channels used by cluster mode and distributed mode nodes to request and/or negotiate for resources, a Resource Management Channel that defines the cluster head's resource allocation for cluster mode nodes, and a Traffic Channel with sub-channels divided into a Coordinated Period (CP) and an Uncoordinated Period (UP).

Figure 3:
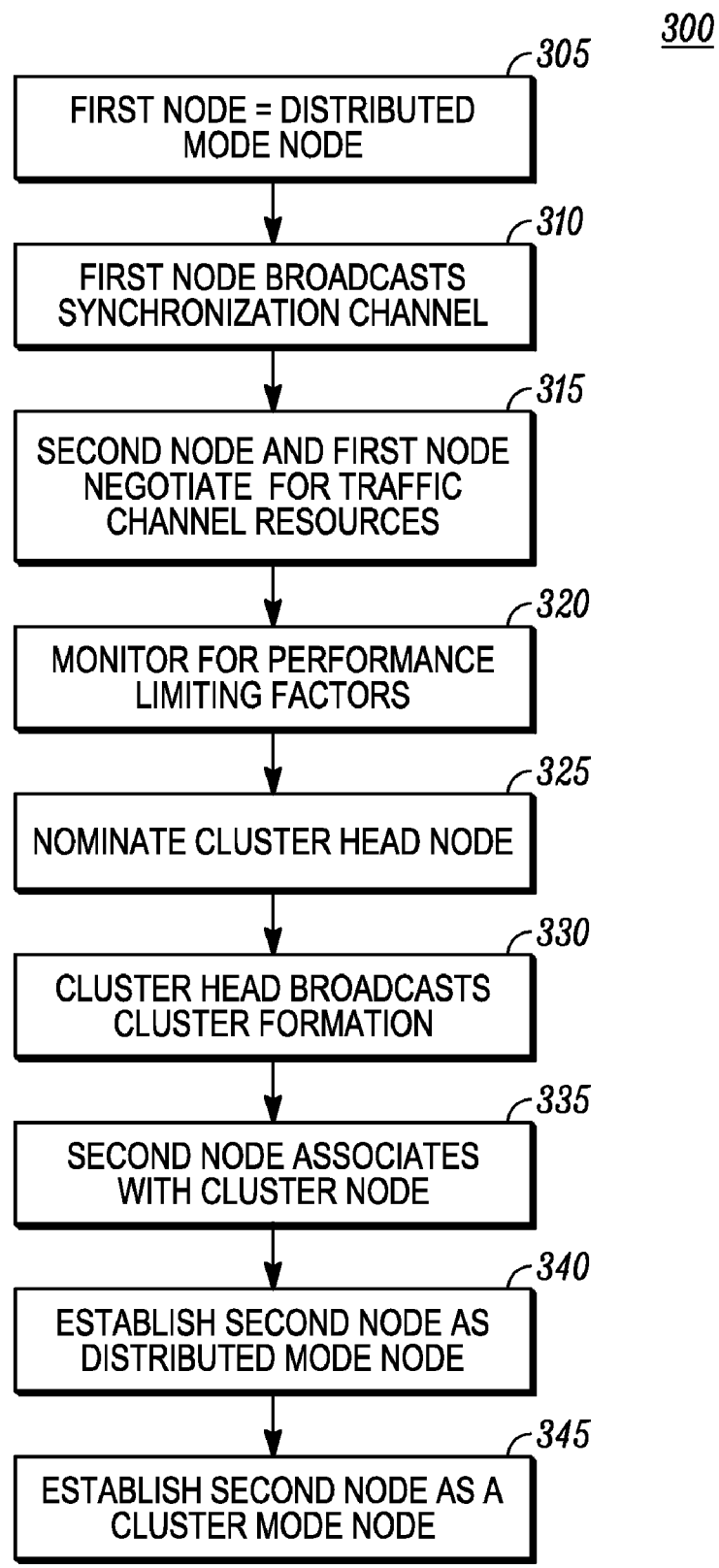
FIG. 3 is a flowchart illustrating the operation of the communication network of FIG. 1 in accordance with some embodiments of the present invention.

FIG. 3 is a flowchart illustrating the operation of the communication network 100 in accordance with some embodiments of the present invention. Specifically, FIG. 3 is a flowchart illustrating a method 300 to transition from a distributed architecture to a clustered or hybrid architecture using this logical channel structure in accordance with some embodiments of the present invention. As illustrated, the method 300 begins with Step 305 in which a first node establishes itself as a distributed mode node. Next, in Step 310, the first node broadcasts a Synchronization Channel to announce the start of a UP. Next, in Step 315, at least a second node negotiates on an Access Channel with the first node for Traffic Channel resources within the UP to establish a communication session. Next, in Step 320, the first node and at least a second node monitors for performance limiting contention on the Access Channel or performance limiting congestion in the Traffic Channel UP. The step of monitoring for performance limiting contention or congestion could also be extended to any metric or combination of metrics that limit performance of the communication sessions (e.g. performance limiting interference). Next, in Step 325, a node is nominated to become a cluster head node. The nominated node, for example, in one embodiment, is a performance limited node. Next, in Step 330, the cluster head node broadcasts on the Synchronization Channel to announce the formation of a cluster, the identity of the cluster head node, the life of the cluster head, and a division of the Traffic Channel into a CP and a UP. Next, in Step 335, at least a second node associates with the cluster head to establish itself as a cluster mode node. Next, in Step 340, at least a second node is established as a distributed mode node negotiating on an Access Channel with the first node for Traffic Channel resources within the UP. Next, in Step 345, at least a second node is established as a cluster mode node requesting resources from the cluster head node for Traffic Channel resources within the CP.

Figure 4:
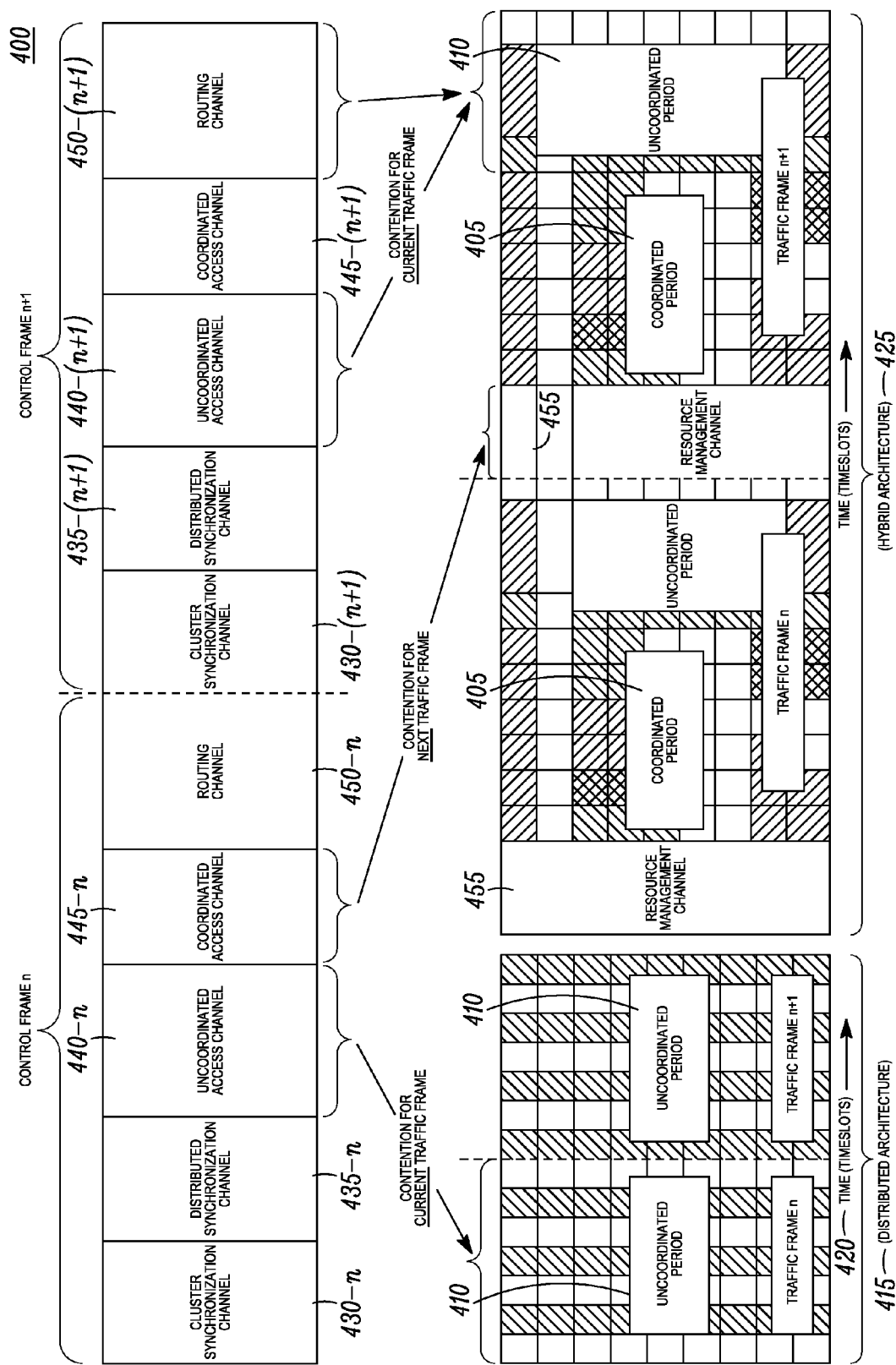
FIGS. 4, 5, and 6 illustrate various examples of frame structures for operation of the communication network of FIG. 1 in accordance with some embodiments of the present invention.

FIG. 4 illustrates an example of a frame structure 400 comprising two consecutive control frames for use in the operation of some embodiments of the present invention. In one embodiment, for example, the control frame structure is the same regardless of whether communication system 100 is configured as a distributed, cluster, or hybrid architecture. There are preferably two transceivers in the system design. One transceiver is used for control and one for data traffic. The control channel and the data traffic channel operate in different frequency bands. The system operates full duplex TDD (time division duplex) in the sense that the control and data channels operate concurrently. The control channel operates, for example, in the 5.7 Giga Hertz (GHz) unlicensed band while the data traffic channel operates, for example, in the 2.4 GHz unlicensed band. It will be appreciated by those of ordinary skill in the art that other spectrum assignments, which include the possibility of licensed bands, are possible and both channels could be assigned to the same band. There are several logical channels associated with the control channel. The control channel is synchronized with the traffic channel. The starting points of the two channels are staggered in time to aid in network synchronization. The frame structure of the data traffic channel comprises a twenty (20) msec superframe having seven 2.7 msec frames. Each frame has forty seven (47) timeslots whereby a variable number of slots are reserved for the Resource Management Channel (RMC). The remaining slots of a frame (data slots) are divided into a Coordinated Period (CP) 405 and an Uncoordinated Period (UP) 410. Two consecutive data traffic frames are illustrated for use when the system is configured as a distributed architecture 415 and two consecutive data traffic frames are illustrated for use when the system is configured as a cluster architecture or as a hybrid architecture 425. When the system is configured as a distributed architecture 415, all data slots correspond to the UP. Thus, the size of the CP and RMC is set to zero. When the system is configured as a clustered or hybrid architecture 425, nodes have the choice of remaining under distributed control of resources or associating with a cluster head that will provide centralized control of resources. Therefore in the cluster or hybrid architecture, data slots are divided between the CP 410 and UP 405 based on the distribution of traffic demands of the nodes and the architecture mode that they operate within. If the traffic demands of nodes wishing to have resources allocated in a more controlled fashion afforded by a cluster mode of operation are greater than the traffic demands of nodes wishing to remain responsible for allocating resources in a distributed fashion, then more data slots are allocated to the CP then are allocated to the UP. However, it is desirable that the cluster head reserve at least one data slot for nodes wishing to remain responsible for allocating resources in a distributed fashion. In one embodiment, the simultaneous support of nodes operating in clustered mode with nodes operating in a distributed mode is made possible because full-band TDMA is a degenerate case of OFDMA-TDMA in terms of the frame structure 400, thus making it possible to flexibly adapt to traffic demands.

Referring again to FIG. 4, the control channel is contention based using a Carrier Sense Multiple Access (CSMA) protocol and contains several logical channels. One embodiment includes a synchronization channel and an access channel, however it will be appreciated that additional logical control channels or sub-channels are possible in accordance with the present invention. The control channel has a repetitive format that aligns with the frame timing of the data traffic channel and begins with a synchronization channel. The synchronization channel is composed of a Cluster Synchronization Channel (CSC) 430 and a Distributed Synchronization Channel (DSC) 435. The CSC 430 contains among other parameters a cluster ID, Coordinated Period (CP) size, Uncoordinated Period (UP) slot location, UP size, future CP size, future UP slot location, future UP size, future UP effective time, future frame size, future frame effective time, synchronization beacon, and paging channel. The future UP effective time represents the superframe that a change in the UP slot location will take effect as an adjustment to changes in the traffic demands of the distributed mode and cluster mode nodes. The CP size and UP size indicate the number of slots allocated to each of these periods. The future CP size and future UP size indicate the number of slots assigned to the CP and UP periods respectively beginning at the future frame effective time. The future frame size and effective time enable adaptation of the number of slots assigned to a cluster based on traffic demands and changes in network characteristics such as topology/node distribution, spatial reuse requirements to mitigate self interference, and external interference. The synchronization beacon includes, among other parameters, a timestamp and a synchronization tier number. The CSC 430 is only broadcast by the cluster head on every frame, so the tier number will be set to zero. The tier #0 identifies the synchronization reference node and the synchronization reference node is the only node that can change the UP location.

The DSC 435 contains most of the information transmitted by a higher tier's CSC 430 or DSC 435. All nodes except the cluster head will share the responsibility to broadcast the DSC 435 in the same fashion that beacons are transmitted in IEEE 802.11 systems. Each time a DSC 435 is broadcast, the transmitting node will add one to the lowest tier number received from another node that broadcast a CSC 430 or DSC 435. In the absence of a cluster head, the tier number can be set to a zero value to represent the reference node for synchronization. The tier #0 identifies the synchronization reference node. The synchronization protocol represented in one embodiment is described, for example, in United States Patent Application Publication Number 20070086424 A1, to Calcev et al, entitled "Method and apparatus for synchronizing a node within an AD-HOC communication system", published on Apr. 19, 2007, assigned to the assignee of the present invention, its entire contents being incorporated herein by reference.

The access channel in the one embodiment is composed of an Uncoordinated Access Channel (UAC) 440, a Coordinated Access Channel (CAC) 445, and a Routing Channel (RC) 450. The UAC 440 is a CSMA channel and is used for resource requests and negotiations by distributed mode nodes. Negotiations for new resources are permitted on this channel (e.g. request to send (RTS), clear to send (CTS) or clear for transmission CFT). The length of this channel is predetermined based on the available data traffic channel bandwidth. The CAC 445 is a CSMA channel and is used for cluster mode nodes requesting resources for the next frame (e.g. RTS). The length of this channel is predetermined based on the available data traffic channel bandwidth. The RC 450 is a CSMA channel. When present, it provides a logical channel for nodes to broadcast or exchange routing related messages.

In an alternate embodiment, the Access Channel is a single logical control channel. The access channel, for example, is a CSMA channel and is used for resource requests and negotiations by both distributed and cluster mode nodes.

FIG. 4 illustrates an uncoordinated period 410 in each traffic channel frame. This period represents the slots that are available for any node that desires to allocate resources with distributed coordination (i.e. Distributed Mode node). Distributed Mode nodes contend on the UAC 440 of the control channel to negotiate exclusive use of a timeslot from the uncoordinated period. FIG. 4 illustrates a coordinated period 405 in each of the two consecutive traffic channel frames for the hybrid architecture 425. This period represents the blocks of frequency and time that are available for allocation to cluster members by the cluster head. Cluster Mode nodes contend on the CAC 445 of the control channel for resources in the next traffic frame where their requests are granted on the Resource Management Channel 455 slots at the start of each traffic frame.

Figure 5:
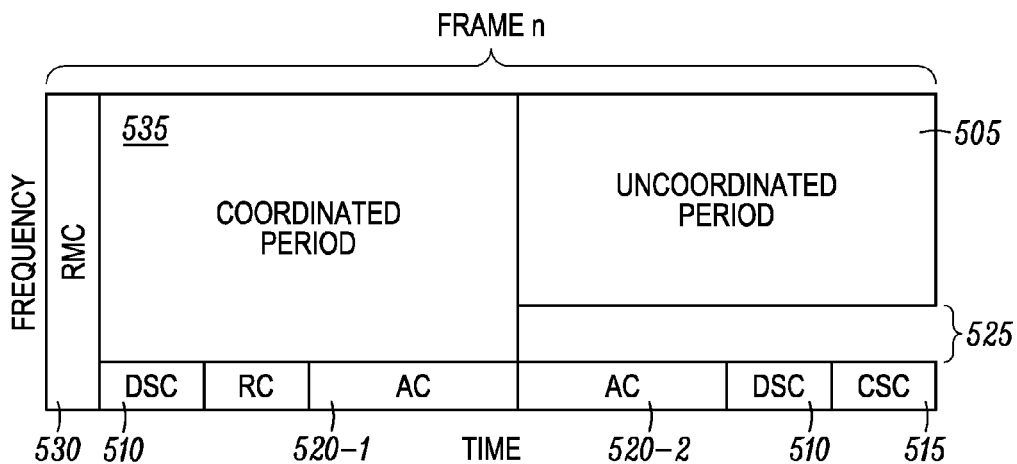
Figure 6:
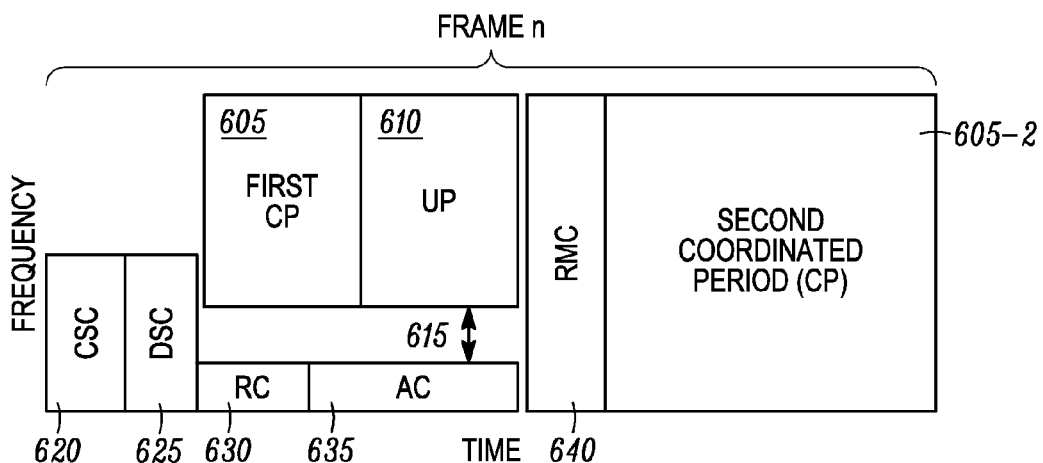

In an alternate embodiment, communication system 100 is configured to operate within a single frequency band. In this embodiment, a single transceiver manages both the logical control channels and the data traffic channel. The frame structure for a single frequency band operation contains the same logical channels with the same functionality present in the preferred embodiment. FIGS. 5 and 6 illustrate two example frame structures for a single frequency band operation.

FIG. 5 illustrates a frame structure 500 whereby control and data traffic channels operate concurrently. In this configuration, the UP 505 has a minimum size which is the size of the DSC 510 and CSC 515. The access channels (AC) 520-1 and 520-2 combine the previously described CAC and UAC functionality. The ACs 520 are independently variable in size depending on the maximum size of the UP 505. The second AC 520-2 may have a zero length size. An FDMA allocation 525 separates the Uncoordinated Period (UP) 505 from the control channel during this portion of the frame. Again, this time is variable depending on how much UP 505 traffic is present. The UP 505 should be far enough separated from the control channel to prevent self interference and desensitization of the receiver. With the control channel operating in the same spectrum as the data channel, a node that is trying to receive a control channel message will not be able to do so if a nearby node is transmitting on a data sub-channel that is adjacent to the control channel portion of the spectrum. So, when resources are allocated from the Coordinated Period (CP) 535 or the UP 505, the scheduler must take precautions when allocating transmit resources. For that reason, the Resource Management Channel RMC 530 occupies the entire spectrum so that all nodes are capable of receiving the RMC content.

FIG. 6 illustrates a frame structure 600 whereby each frame is divided in time between the logical control channels comprising the CSC 620, the DSC 625, the Routing Channel (RC) 630, the Access Channel (635), and the RMC 640, and the second Coordinated Period (CP) 605-2 portion of the data traffic channel An FDMA allocation separates the UP 610 and the first CP 605-1 from the logical control channels RC 630 and AC 635 during this portion of the frame. The UP 610 should be far enough separated from the control channel to prevent self interference and desensitization of the receiver. This separation 615 is reduced by the intelligent scheduling and use of CP 605 and UP 610 resources to eliminate near/far problems caused by a node trying to receive a control channel message from a nearby node that is transmitting on a data sub-channel adjacent to the control channel portion of the spectrum. For that reason, the CSC 620 and DSC 625 do not share the spectrum with the CP 605 or UP 610 so that all nodes are capable of receiving the CP 605 and UP 610 content. In another embodiment (not shown), the control and data channels share the same frequency band in time, with the control channel using some of the time-slots of the frame and the data channel using the remaining time-slots. This would be a half duplex embodiment in the sense that the control channel and data traffic channel alternate their operation.

In an alternative embodiment (not shown), the system is configured with more than one control channel, with each cluster head occupying its own control channel for the duration of a superframe. The system can in effect be configured to have up to seven control channels that would be used by each neighboring cluster head and each cluster head would occupy its control channel continuously. Cluster heads can communicate with each other in order to determine the number of control channels and the channel and times in which each cluster head is active. This flexibility allows the system to provide more control information when a single control channel shared in time is not able to load of control channel signaling.

Figure 7:
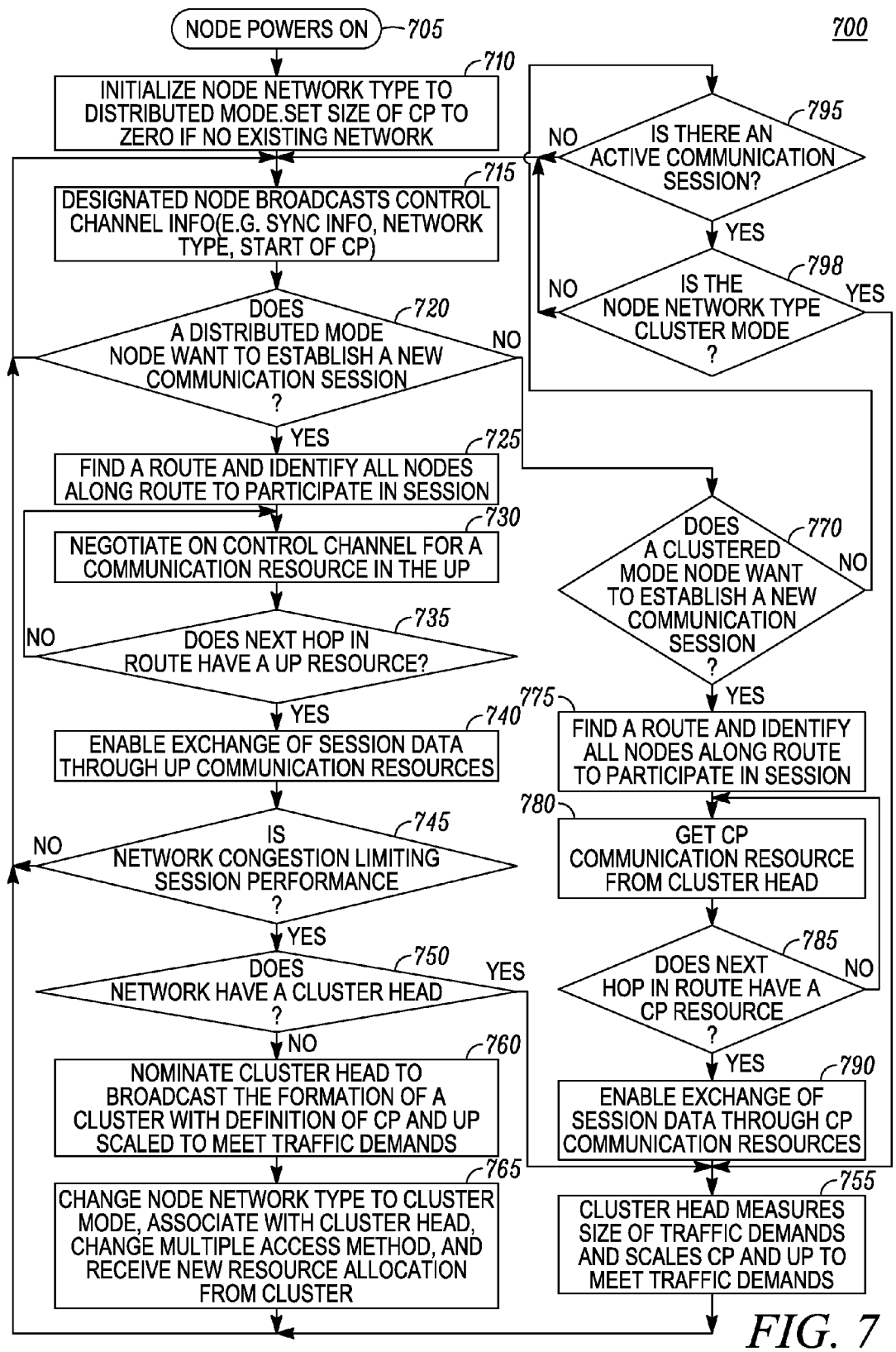
FIG. 7 is a flowchart illustrating further detail of the operation of FIG. 3 in accordance with some embodiments of the present invention.

FIG. 7 is a flowchart illustrating further detail of the operation 300 of the communication network 100 in accordance with some embodiments of the present invention. Specifically, FIG. 7 is a flowchart illustrating a method 700 for morphing a distributed architecture into a clustered or hybrid architecture in accordance with some embodiments of the present invention. Additional procedures are also defined below to maintain the cluster and to dissolve it if nodes no longer desire the services of a cluster.

As illustrated in FIG. 7, the method begins with Step 705, in which a first node of the network powers on. Next, in Step 710, initially, each node defaults to operation within a distributed mode of operation when they power on. Therefore when the first node powers up, the system by nature is a distributed architecture and the available data slots within the frame structure will be assigned to the Uncoordinated Period (UP). Next, in Step 715, when the first node is initializing, it starts the transmission of the control channel which contains information for other nodes to form an ad hoc network. For example, the control channel contains synchronization information, network identification (ID), network type (e.g. distributed or clustered architecture), number of reserved control channel slots, channelization information (e.g. size of the Coordinated Period (CP) and orthogonal resource allocation if cluster exists), interference measurement information, and the like. The control channel is comprised of several logical channels, one of them being an Access Channel (UAC or CAC). The Access Channel enables nodes to negotiate for resources. In one embodiment, the first node is a gateway node that enables interconnection with a wide area network. Such a gateway may be fixed or mobile.

As additional nodes power on, they will also default to operation within a distributed mode of operation. Each new node scans for an existing control channel and synchronizes to the existing nodes that are also operating in a distributed mode of operation. Once two or more nodes have joined the network, the establishment of a communication session is possible.

Next, in Step 720, it is determined whether or not a distributed mode node wants to establish a new communication session. When a distributed mode node wants to establish a new communication session in Step 720, the operation continues to Step 725 in which routing procedures are utilized to find a route and identify all nodes along the route to that will be required to establish the communication session.

Next, in Step 730, the establishment of a communication session requires each node to negotiate for communication resources with other proximate nodes. This negotiation begins on the Access Channel (UAC) and may continue through several symbol periods on the control channel. These communications resources are, for example, timeslots from the UP with allocations of the entire available bandwidth. In an alternate embodiment the resources may be resource blocks representing allocations in both frequency and time (e.g. partial bandwidth over multiple timeslots). In one embodiment, negotiations may be for a single timeslot, or alternatively negotiations could be for a series of timeslot assignments over a predetermined period of time. Once the negotiations are complete, the communication can begin with each of the nodes selected by the routing procedure. Therefore, as illustrated, the method continues with Step 735 in which it is determined whether or not the next hop in the route has a UP resource. When the next hop does not have a UP resource, the operation cycles back to Step 730. When the next hop does have a UP resource, the operation continues to Step 740 in which the exchange of session data through the UP communication resources is enabled.

Next, in Step 745, it is determined whether the network congestion is limiting network performance. When the network congestion is not limiting network performance in Step 745, the operation cycles back to Step 715 in which the previously described process of joining the network and establishing sessions may continue. When the nodes begin to experience performance limiting contention, in Step 745, the operation continues to Step 750 in which it is determined whether or not the network has a cluster head. When a cluster head exists, the operation continues to Step 755 in which the cluster head measures the size of traffic demands and scales CP and UP to meet traffic demands. The operation then cycles back to Step 715.

When a cluster head does not exist in Step 750, the operation continues to Step 760 in which one of the nodes nominates itself (or is nominated by others) to become a cluster head. The cluster head broadcasts a message on the control channel that some timeslots from the data traffic channel frame will be managed by the cluster head in a Coordinated Period (CP) thereby reducing the number of Uncoordinated Period (UP) data traffic channel timeslots. All nodes must observe this new division of data timeslots. Next, in Step 765, the node network type is changed to cluster mode and nodes must either associate with the cluster head to request resource allocations or continue to contend for resources through negotiations with other nodes. Nodes that associate with the cluster head will request a new resource from the cluster head and change multiple access method from TDMA to OFDMA-TDMA to accommodate the new resource allocation. All requests and negotiations occur on the Access Channel (CAC or UAC). The operation then cycles back to Step 715.

Returning to Step 720, when a distributed mode node does not want to start a new communication session, the operation continues to Step 770 in which it is determined whether or not a clustered mode node wants to establish a new communication session.

When a cluster mode node wants to establish a new communication session in Step 770, the operation continues to Step 775 in which routing procedures are utilized to find a route and identify all nodes along the route to that will be required to establish the communication session.

Next, in Step 780, CP communication resources are obtained from the cluster head. If cluster associated nodes request resources from the cluster head, the cluster head's scheduling and resource manager may subdivide the CP in frequency and time dimensions to accommodate the bandwidth requirements of the requesting node. Hence, multiple sessions may share CP timeslots. On the other hand, if distributed mode nodes negotiate for use of a timeslot in the UP, only one session will occupy a UP timeslot during a single frame.

Next, in Step 785, it is determined whether the next hop in the route has a CP resource. When the next hop does not have a CP resource, the operation cycles back to Step 780. When the next hop does have a CP resource, the operation continues to Step 790 in which the exchange of session data through the CP communication resources is enabled.

Returning to Step 770, when no clustered mode node wants to establish a new communication session, the operation continues to Step 795 in which it is determined whether or not there is an active communication session. When there is no active communication session in Step 795, the operation cycles back to Step 715 as previously described herein. When there is an active communication session Step 795, the operation continues to Step 798 in which it is determined whether or not the node network type is a cluster mode. When the node network type is not a cluster mode, the operation cycles back to Step 715 as previously described herein.

When the node network type is cluster mode in step 798, and after the exchange of session data is enabled in Step 790, and when the network has a cluster head in Step 750, the operation continues to Step 755, in which the cluster head measures the size of traffic demands and scales CP and UP to meet traffic demands. The cluster head is responsible to monitor all control channel activity. Distributed mode resource negotiations and cluster mode resource requests are all handled by the resource manager. As the number of nodes associating and requesting resource allocations with the cluster head (along with the size of their requests) changes in comparison with the number of distributed mode nodes negotiating for resources with other distributed mode nodes (along with the size of their requests), the cluster head will dynamically adjust the size (number) of the CP and UP to meet the traffic demands of the nodes in the cluster. These dynamic changes are advertised on the control channel by the cluster head. The operation then cycles back to Step 715 as described previously herein.

Newcomer nodes to the network will initially operate as a distributed mode node as described previously herein with respect to Step 710. It will be appreciated by those of ordinary skill in the art that the newcomer nodes will first scan for the presence of a control channel being transmitted by one or more existing nodes. If the control channel information contains a network type indicating the presence of a cluster, the newcomer node has the option to associate with the cluster and operate in cluster mode or to remain in the distributed mode. If the newcomer node remains in distributed mode and wants to establish a communication session, it can contend on the control channel uncoordinated access channel (UAC) along with other distributed and clustered mode nodes. If the newcomer node successfully accesses the control channel during the UAC, it negotiates with other distributed and clustered mode nodes for a timeslot in the UP. Alternatively, if the newcomer node associates with the cluster head, it can make a resource request on the control channel coordinated access channel (CAC) or the UAC. When the resource request is on the CAC, the cluster head will then grant an allocation from the CP appropriately sized for the bandwidth requirements of the newcomer session. Alternatively, when the resource request is on the UAC, the newcomer cluster mode node negotiates with other distributed and clustered mode nodes for a timeslot in the UP.

In an alternate embodiment (not shown), the distributed architecture 105 or the clustered architecture 110 uses FDMA-TDMA as the access method. The communication system 100 would divide the available bandwidth into smaller channels (e.g. 5 Mega Hertz (MHz) channels) and would allocate channels when the traffic requirement load was light and, only when the number of connections increases above a level not sustainable with FDMA allocations, the system would start aggregating FDMA channels and allocate resources in time and frequency using OFDMA-TDMA. Such aggregation could take into consideration the preferences of nodes, allowing group of nodes to remain operating in smaller FDMA bandwidths if desired. Additionally, when a high bandwidth connection starts that cannot be sustained in the smaller FDMA channels, FDMA channels would be aggregated and OFDMA operation would start. In another embodiment (not shown), the frame could be divided into a mix of FDMA and OFDMA allocations. For example, resources for the first ten slots after the RMC could be allocated OFDMA, resources for the middle twenty two slots could be allocated FDMA, and resources from the remaining ten slots could be allocated OFDMA. In either embodiment, the control channel continues to provide an access channel (CAC and UAC) for nodes to negotiate respectively OFDMA or FDMA resources in the CP and UP of the data traffic channel as described previously herein.

Figure 8:
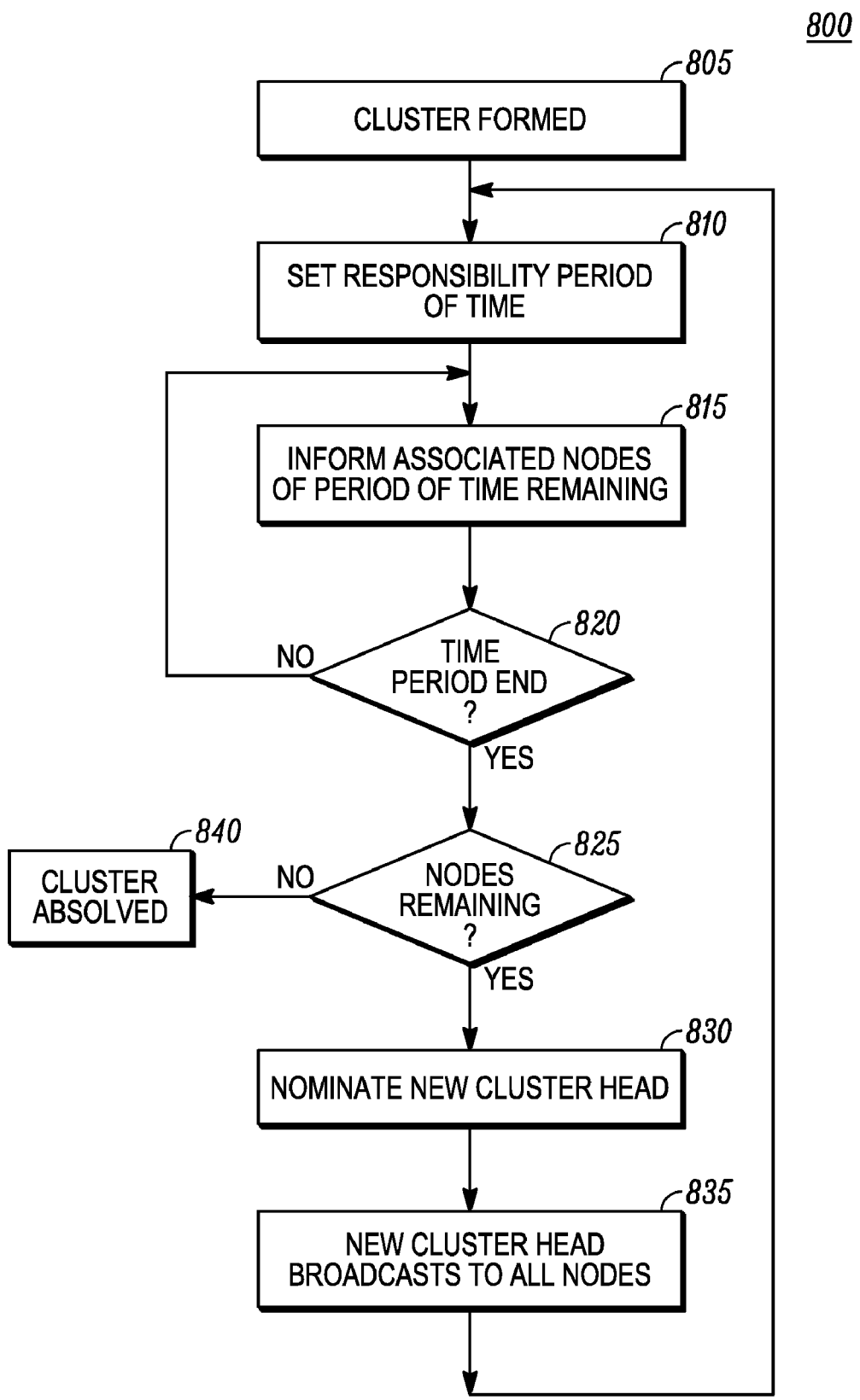
FIG. 8 is a flowchart illustrating the operation of the communication network of FIG. 1 in accordance with some embodiments of the present invention.

FIG. 8 is a flowchart illustrating a method 800 for the transition of a cluster head's responsibilities within a communication network. The operation begins with Step 805 in which a cluster is formed. Next, in Step 810, once a cluster is formed, the node that assumes the role of a cluster head retains that responsibility for a fixed period of time regardless of the congestion level in the cluster. Next, in Step 815, the associated nodes are informed of the period of time. For example, the synchronization channel could advertise the period of time remaining for a cluster head's reign over the cluster. Alternatively, the cluster head can reduce the period of time remaining by an explicit message to all nodes in the cluster, which would adjust the information in the synchronization channel. Next, in Step 820, it is determined whether the period of time has ended. If it has not ended, the operation cycles back to Step 815. During the time period, every node that previously associated with the cluster is free to stop using the services of the cluster head and begin negotiating for use of resources strictly during the UP. Such a node has essentially returned to a distributed architecture (although it still must still abide by the rules of a region managed by a cluster head). This is a reasonable decision of a node if it is no longer experiencing congestion.

When the period of time ends in which the cluster head has just served in Step 820, the operation continues to Step 825 in which it is determined whether nodes remain associated with the cluster head.

When nodes remain associated with the cluster head, the operation continues to Step 830 in which the cluster head will nominate a new cluster head and transfer the context of the scheduler and resource manager to the newly nominated cluster head. This nomination will be based on one or more factors such as the associated node that is making the most demanding requests for resources (implies that only those nodes that are making requests for resources are candidates for becoming a cluster head), the node that is battery- or grid-powered, the node with the most battery (implies that a battery level of a node should be conveyed to the cluster head periodically), the node with the most one-hop neighbors, the node that has not served as a cluster head for the longest period, the node that is currently providing a clock reference for synchronization of the cluster, random selection, etc. Other solutions include nodes periodically advertising their congestion and if one becomes more congested and has more traffic, it could take over the cluster head position. In any case, this information should be conveyed to the cluster head (or even to neighboring nodes). Some of this information may also be part of the MAC header. Alternatively, an associated node could nominate itself based on one or more of the same factors just listed. Next, in Step 835, the new nomination will be broadcast to all nodes over the control channel with an effective time to insure that all nodes move to the new cluster head at the same time. The operation then cycles back to Step 810 as previously described herein.

Returning to Step 825, in the event that nodes have all stopped using the services of the cluster head (i.e. they are all operating as distributed nodes by allocating their own UP resources), then no cluster head will be nominated. The operation continues to Step 840 in which the outgoing cluster head will set the CP to a zero length and the synchronization channel will no longer advertise the presence of a cluster. The outgoing cluster head will broadcast a notification to all associated node that the cluster has been dissolved and they are no longer bound to it.

Some clusters will not be dissolved regardless of congestion level. For instance, gateway nodes or other nodes that are constantly powered should proactively form a cluster and maintain that cluster even in the absence of congestion. In such case, the rotation of cluster head function can be suspended and the constantly powered node would remain as cluster head of the cluster until rotation is resumed, which would happen if another node has more favorable conditions to perform the cluster head function. As these nodes have no battery conservation concerns, they pay no penalty for coordinating the traffic of their neighboring nodes. As mentioned above, the CP scales to utilize only the portion of a cluster's frame that is required for scheduled resources. The remaining time is left as a UP to allow for traffic from nodes that have no need to join the cluster.

Just as with handover algorithms, a hysteresis mechanism is included to ensure there is not a ping-pong effect between the two modes of operation.

In addition to the above procedural requirements, the cluster head is assigned a priority metric. If a node can hear multiple cluster heads, it should join the cluster that has the highest priority. In this way, fixed nodes (such as gateways, seeds, etc.) would have the highest priority as they likely have the most resources (power, DSP speed, etc.). A cluster head's priority could be a composite of other metrics such as battery power, processing ability, mobility, etc. and help nodes find the best cluster to join. The priority metric would be transmitted by the cluster head on the control channel at the beginning of each frame.

The present invention provides a unique logical channel structure coupled with a unique procedure to enable a distributed architecture to morph into a hybrid architecture that supports both distributed mode nodes and cluster mode nodes. This implies that the method of resource allocation can change from supporting strictly negotiated allocations between loosely coupled distributed ad hoc nodes to supporting a combination of negotiated allocations between distributed nodes and centralized cluster head allocations between nodes associated with a cluster. The end result is a communication network that can adapt to the environment and scale to meet capacity demands with a transformation that more efficiently allocates resources for nodes needing high quality of service (QoS) communication sessions while still being nimble enough to handle short spontaneous communication sessions that can tolerate lower QoS.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. A method of resource allocation operation of a communication system, the method comprising:
    operating the communication system in a distributed architecture network mode;
    reconfiguring a first portion of the communication system to operate in a clustered architecture network in response to an increase in one or more network performance requirements;
    continue operating a second portion of the communication network as a distributed architecture network, wherein one or more nodes within the communication network operate within both the distributed architecture network and the clustered architecture network;
    selecting, by each of the one or more nodes, to operate within the clustered architecture network including associating with a cluster head of the clustered architecture network for resource allocations at a first period of time; and
    selecting, by each of the one or more nodes, to operate within the distributed architecture network including operating in a distributed mode to negotiate for its own resources at a second period of time.

2. The method of resource allocation operation of a communication system as claimed in claim 1, wherein the one or more network performance requirements are selected from a group comprising a number of nodes, a traffic demand, a network capacity, a topology/node distribution, a spatial reuse requirement to mitigate self interference, and an external interference mitigation.

3. The method of resource allocation operation of a communication system as claimed in claim 1, wherein the step of reconfiguring the communication system comprises reconfiguring a multiple access scheme.

4. The method of resource allocation operation of a communication system as claimed in claim 3, wherein:
    the operating step comprises operating the communication system using a first multiple access scheme, wherein the first multiple access scheme comprises a Time Division Multiple Access scheme, and
    wherein the reconfiguring step comprises reconfiguring the multiple access scheme to a second multiple access scheme, wherein the second multiple access scheme is selected from a group comprising an Orthogonal Frequency Division Multiple Access-Time Division Multiple Access scheme, a Carrier Sense Multiple Access scheme, and a Frequency Division Multiple Access scheme.

5. A method of resource allocation operation of a communication system as claimed in claim 1, wherein at least one of the nodes is a relay node for bridging the distributed architecture network and the clustered architecture network.

6. A method of resource allocation operation of a communication system as claimed in claim 1 wherein the distributed architecture network operates in a networking mode selected from a group comprising an autonomous ad hoc networking mode and a hybrid mesh networking mode.

7. A method of resource allocation operation of a communication system as claimed in claim 1 wherein the clustered architecture network operates in a networking mode selected from a group comprising an autonomous ad hoc networking mode and a hybrid mesh networking mode.

8. A method of resource allocation operation of a communication system as claimed in claim 1, wherein the communication system comprises a plurality of nodes, and further wherein the plurality of nodes communicate using a logical channel structure comprising a coordinated period and an uncoordinated period, the method further comprising:
    reconfiguring a size of the coordinated period and a size of the uncoordinated period in response to a change in one or more network performance requirements.

9. A method of resource allocation operation of a communication system as claimed in claim 8, wherein the logical channel comprises:
    a synchronization channel comprising sub-channels for conveying one or more of a synchronization information, a paging information, and a system information,
    an access channel comprising sub-channels for requesting and negotiating for resources by the plurality of nodes,
    a resource management channel for identifying a resource allocation for each of the plurality of nodes operating within the cluster architecture network, and
    a traffic channel comprising sub-channels divided into the coordinated period and the uncoordinated period.

10. A method of resource allocation operation of a communication system as claimed in claim 1,
    wherein the step of operating the communication system in a distributed architecture network mode comprises:
        establishing a first node as a distributed mode node,
        broadcasting by the first node broadcasts a synchronization channel to announce the start of an uncoordinated period, and
        negotiating by at least one distributed mode node on an access channel with the first node for traffic channel resources within the uncoordinated period to establish a communication session, and
    wherein the step of reconfiguring the communication system to operate in a clustered architecture network comprises:
        monitoring the network by the first node and the at least one other node for performance limiting factors,
        when performance limiting factors are identified in the monitoring step:
        nominating a node as a cluster head node,
        broadcasting by the cluster head node on the synchronization channel an announcement of the formation of the clustered architecture network including a division of the traffic channel into a coordinated period and an uncoordinated period,
        associating by at least one cluster mode node with the cluster head node, wherein the at least one cluster mode node requests resources from the cluster head node for one or more traffic channel resources within the coordinated period.

11. A method of resource allocation operation of a communication system as claimed in claim 10, wherein the performance limiting factors are selected from a group comprising a performance limiting contention on the access channel, a performance limiting congestion in the traffic channel uncoordinated period, and a performance limiting interference.

12. A method of resource allocation operation of a communication system as claimed in claim 10, wherein the step of broadcasting by the cluster head node on the synchronization channel an announcement of the formation of the clustered architecture network further comprises broadcasting an identity of the cluster head node and an operational time period of the cluster head node.

13. A method of resource allocation operation of a communication system as claimed in claim 1, wherein the communication system comprises a plurality of nodes, and further wherein the plurality of nodes communicate messages using a frame structure comprising an uncoordinated period and a coordinated period, the method further comprising:
reconfiguring a size of the coordinated period and a size of the uncoordinated period in response to a change in one or more network performance requirements.

14. The method of resource allocation operation of a communication system as claimed in claim 13, wherein the one or more network performance requirements are selected from a group comprising a number of nodes, a traffic demand, a network capacity, a topology/node distribution, a spatial reuse requirement to mitigate self interference, and an external interference mitigation.

15. A method of resource allocation operation of a communication system, the method comprising:
operating the communication system in a clustered architecture network mode;
reconfiguring a first portion of the communication system to operate in a distributed architecture network in response to a decrease in one or more network performance requirements;
continue operating a second portion of the communication network as a clustered architecture network, wherein one or more nodes within the communication network operate within both the distributed architecture network and the clustered architecture network;
selecting, by each of the one or more nodes, to operate within the clustered architecture network including associating with a cluster head of the clustered architecture network for resource allocations at a first period of time; and
selecting, by each of the one or more nodes, to operate within the distributed architecture network including operating in a distributed mode to negotiate for its own resources at a second period of time.

16. The method of resource allocation operation of a communication system as claimed in claim 15, wherein the one or more network performance requirements are selected from a group comprising a number of nodes, a traffic demand, a network capacity, a topology/node distribution, a spatial reuse requirement to mitigate self interference, and an external interference mitigation.

17. The method of resource allocation operation of a communication system as claimed in claim 15, wherein the step of reconfiguring the communication system comprises reconfiguring a multiple access scheme.

18. The method of resource allocation operation of a communication system as claimed in claim 17, wherein:
the operating step comprises operating the communication system using a first multiple access scheme, wherein the first multiple access scheme is selected from a group comprising an Orthogonal Frequency Division Multiple Access-Time Division Multiple Access scheme, a Carrier Sense Multiple Access scheme, and a Frequency Division Multiple Access scheme, and
wherein the reconfiguring step comprises reconfiguring the multiple access scheme to a second multiple access scheme, wherein the second multiple access scheme comprises a Time Division Multiple Access scheme.

19. A method of resource allocation operation of a communication system as claimed in claim 15, wherein at least one of the nodes is a relay node for bridging the distributed architecture network and the clustered architecture network.

20. A method of resource allocation operation of a communication system as claimed in claim 15 wherein the distributed architecture network operates in a networking mode selected from a group comprising an autonomous ad hoc networking mode and a hybrid mesh networking mode.

21. A method of resource allocation operation of a communication system as claimed in claim 15 wherein the clustered architecture network operates in a networking mode selected from a group comprising an autonomous ad hoc networking mode and a hybrid mesh networking mode.

22. A method of resource allocation operation of a communication system as claimed in claim 15, wherein the communication system comprises a plurality of nodes, and further wherein the plurality of nodes communicate using a logical channel structure comprising a coordinated period and an uncoordinated period, the method further comprising:
reconfiguring a size of the coordinated period and a size of the uncoordinated period in response to a change in one or more network performance requirements.

23. A method of resource allocation operation of a communication system as claimed in claim 22, wherein the logical channel comprises:
a synchronization channel comprising sub-channels for conveying one or more of a synchronization information, a paging information, and a system information,
an access channel comprising sub-channels for requesting and negotiating for resources by the plurality of nodes,
a resource management channel for identifying a resource allocation for each of the plurality of nodes operating within the cluster architecture network, and
a traffic channel comprising sub-channels divided into the coordinated period and the uncoordinated period.

24. A method of resource allocation operation of a communication system as claimed in claim 15, wherein the communication system comprises a plurality of nodes, and further wherein the plurality of nodes communicate messages using a frame structure comprising an uncoordinated period and a coordinated period, the method further comprising:
reconfiguring a size of the coordinated period and a size of the uncoordinated period in response to a change in one or more network performance requirements.

25. A communication system comprising:
a plurality of nodes operating in a distributed architecture network mode, wherein at least a portion of the plurality of nodes are reconfigured to operate in a clustered architecture network mode in response to an increase in one or more network performance requirements,
wherein the plurality of nodes communicate using a logical channel structure comprising a coordinated period and an uncoordinated period, wherein a size of the coordinated period and a size of the uncoordinated period is reconfigured in response to a change in one or more network performance requirements,
wherein the logical channel comprises:
a synchronization channel comprising sub-channels for conveying one or more of a synchronization information, a paging information, and a system information, an access channel comprising sub-channels for requesting and negotiating for resources by the plurality of nodes, a resource management channel for identifying a resource allocation for each of the plurality of nodes operating within the cluster architecture network, and a traffic channel comprising sub-channels divided into the coordinated period and the uncoordinated period.

26. The communication system as claimed in claim 25, wherein the one or more network performance requirements are selected from a group comprising a number of nodes, a traffic demand, a network capacity, a topology/node distribution, a spatial reuse requirement to mitigate self interference, and an external interference mitigation.

27. A communication system as claimed in claim 25, wherein one or more nodes within the communication network operate in both the distributed architecture network mode and the clustered architecture network mode.

28. A communication system as claimed in claim 25, wherein at least one of the nodes is a relay node for bridging communication between the distributed architecture network mode nodes and the clustered architecture network mode nodes.

29. A communication system as claimed in claim 25 comprising a network selected from a group comprising an autonomous ad hoc network and a hybrid mesh network.

30. A communication system as claimed in claim 25, wherein the plurality of nodes communicate messages using a frame structure comprising an uncoordinated period and a coordinated period, and further wherein a size of the coordinated period and a size of the uncoordinated period is reconfigured in response to a change in one or more network performance requirements.

31. The communication system as claimed in claim 30, wherein the one or more network performance requirements are selected from a group comprising a number of nodes, a traffic demand, a network capacity, a topology/node distribution, a spatial reuse requirement to mitigate self interference, and an external interference mitigation.

32. A communication system as claimed in claim 25, wherein a plurality of clusters form in a geographical region, and further wherein each of the plurality of clusters operates in a unique associated frame.

33. A communication system as claimed in claim 32, wherein a time allocated to each frame associated with each cluster is adaptable to one or more network conditions in each of the clusters.

34. A communication system comprising:

a plurality of nodes operating in a clustered architecture network mode, wherein at least a portion of the plurality of nodes are reconfigured to operate in a distributed architecture network mode in response to a decrease in one or more network performance requirements, wherein the plurality of nodes communicate using a logical channel structure comprising a coordinated period and an uncoordinated period, wherein a size of the coordinated period and a size of the uncoordinated period is reconfigured in response to a change in one or more network performance requirements, wherein the logical channel comprises:

a synchronization channel comprising sub-channels for conveying one or more of a synchronization information, a paging information, and a system information, an access channel comprising sub-channels for requesting and negotiating for resources by the plurality of nodes, a resource management channel for identifying a resource allocation for each of the plurality of nodes operating within the cluster architecture network, and a traffic channel comprising sub-channels divided into the coordinated period and the uncoordinated period.

* * * * *